United States Patent
Taguchi

(10) Patent No.: US 12,095,113 B2
(45) Date of Patent: Sep. 17, 2024

(54) COMPOSITION FOR NON-AQUEOUS SECONDARY BATTERY FUNCTIONAL LAYER AND METHOD OF PRODUCING SAME, FUNCTIONAL LAYER FOR NON-AQUEOUS SECONDARY BATTERY, NON- AQUEOUS SECONDARY BATTERY MEMBER, AND NON-AQUEOUS SECONDARY BATTERY

(71) Applicant: ZEON CORPORATION, Tokyo (JP)

(72) Inventor: Hiroyuki Taguchi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 766 days.

(21) Appl. No.: 17/262,744

(22) PCT Filed: Jul. 30, 2019

(86) PCT No.: PCT/JP2019/029868
§ 371 (c)(1),
(2) Date: Jan. 25, 2021

(87) PCT Pub. No.: WO2020/031791
PCT Pub. Date: Feb. 13, 2020

(65) Prior Publication Data
US 2021/0194092 A1 Jun. 24, 2021

(30) Foreign Application Priority Data
Aug. 7, 2018 (JP) .................. 2018-148839

(51) Int. Cl.
*H01M 50/443* (2021.01)
*C08L 25/14* (2006.01)
*H01M 4/13* (2010.01)
*H01M 4/62* (2006.01)
*H01M 10/0525* (2010.01)
*H01M 50/414* (2021.01)
*H01M 50/449* (2021.01)
*H01M 50/403* (2021.01)
*H01M 50/489* (2021.01)
*H01M 50/491* (2021.01)

(52) U.S. Cl.
CPC ........... *H01M 50/443* (2021.01); *C08L 25/14* (2013.01); *H01M 4/13* (2013.01); *H01M 4/62* (2013.01); *H01M 10/0525* (2013.01); *H01M 50/414* (2021.01); *H01M 50/449* (2021.01); *C08L 2205/025* (2013.01); *C08L 2205/03* (2013.01); *C08L 2207/53* (2013.01); *H01M 50/403* (2021.01); *H01M 50/489* (2021.01); *H01M 50/491* (2021.01)

(58) Field of Classification Search
None
See application file for complete search history.

(56) References Cited

U.S. PATENT DOCUMENTS

| | | | |
|---|---|---|---|
| 9,811,018 B2 | 11/2017 | Taguchi et al. | |
| 2012/0315575 A1 | 12/2012 | Kaneda | |
| 2013/0330622 A1 | 12/2013 | Sasaki | |
| 2014/0370430 A1 | 12/2014 | Kmiecik-Lawrynowicz et al. | |
| 2016/0104893 A1 | 4/2016 | Kazuaki et al. | |
| 2016/0291495 A1 | 10/2016 | Taguchi et al. | |
| 2017/0363984 A1 | 12/2017 | Veregin et al. | |
| 2019/0165350 A1* | 5/2019 | Oguro ................. H01M 50/449 |

FOREIGN PATENT DOCUMENTS

| | | | |
|---|---|---|---|
| CN | 105247717 A | | 1/2016 |
| CN | 105355824 A | | 2/2016 |
| CN | 105745581 A | | 7/2016 |
| CN | 105974750 | * | 9/2016 |
| JP | 2004-118009 | * | 4/2004 |
| JP | 2013145763 A | | 7/2013 |
| JP | 2015041606 A | | 3/2015 |
| WO | 2012115096 A1 | | 8/2012 |
| WO | 2017115647 A1 | | 7/2017 |
| WO | WO 2017/115647 | * | 7/2017 |

OTHER PUBLICATIONS

Apr. 7, 2022, the Extended European Search Report issued by the European Patent Office in the corresponding European Patent Application No. 19847676.4.
Feb. 9, 2021, International Preliminary Report on Patentability issued in the International Patent Application No. PCT/JP2019/029868.

* cited by examiner

*Primary Examiner* — Laura Weiner
(74) *Attorney, Agent, or Firm* — KENJA IP LAW PC

(57) ABSTRACT

Provided is a composition for a non-aqueous secondary battery functional layer with which it is possible to form a functional layer that can cause a separator to display excellent shutdown function. The composition for a non-aqueous secondary battery functional layer contains organic particles A. The organic particles A contain a polymer X including an aromatic vinyl monomer unit in a proportion of 20 mass % or more and a wax having a melting point of lower than 95° C. The wax is preferably an ester wax.

12 Claims, No Drawings

COMPOSITION FOR NON-AQUEOUS SECONDARY BATTERY FUNCTIONAL LAYER AND METHOD OF PRODUCING SAME, FUNCTIONAL LAYER FOR NON-AQUEOUS SECONDARY BATTERY, NON- AQUEOUS SECONDARY BATTERY MEMBER, AND NON-AQUEOUS SECONDARY BATTERY

TECHNICAL FIELD

The present disclosure relates to a composition for a non-aqueous secondary battery functional layer and method of producing the same, a functional layer for a non-aqueous secondary battery, a non-aqueous secondary battery member, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy density, and the ability to be repeatedly charged and discharged, and are used in a wide variety of applications. A non-aqueous secondary battery generally includes battery members such as a positive electrode, a negative electrode, and a separator that isolates the positive electrode and the negative electrode from each other.

The separator has an important function of preventing an electrical short-circuit between the positive and negative electrodes of the secondary battery. The separator of the secondary battery is typically a microporous membrane formed of polyolefinic resin, for example. The separator normally also plays a role in maintaining safety of the secondary battery by, in a situation in which the internal temperature of the battery reaches a high temperature of around 130° C., for example, melting such as to block micropores therein and thereby display a shutdown function of preventing movement of ions and cutting off electrical current.

Also note that battery members including functional layers such as a porous membrane layer for improving heat resistance and strength or an adhesive layer for improving adhesiveness between battery members are currently being used in secondary batteries.

Specific examples of such battery members that are being used include an electrode that further includes a functional layer formed on an electrode substrate in which an electrode mixed material layer is disposed on a current collector and a separator that includes a functional layer formed on a separator substrate. These functional layers are typically formed by supplying a composition for a non-aqueous secondary battery functional layer (hereinafter, also referred to simply as a "composition for a functional layer") in the form of a slurry containing a binder component and a dispersion medium, such as water, onto a suitable substrate, such as an electrode substrate or a separator substrate, and then drying the composition for a functional layer.

In recent years, much effort has been focused on the development of functional layers containing components that can melt and increase the internal resistance of a secondary battery when abnormal heating occurs for use as functional layers that can further enhance the shutdown function of a separator described above.

In one example, Patent Literature (PTL) 1 discloses a functional layer that is a heat-sensitive layer formed using a composition that contains particles in which a second component is substantially partially disposed at the outside of a particle formed of a first component and that has a storage modulus at 60° C. and a storage modulus at 150° C. that are within specific ranges.

CITATION LIST

Patent Literature

PTL 1: WO2017/115647A1

SUMMARY

Technical Problem

However, even when the functional layer of the conventional technique described above is used in a secondary battery, there is still room for improvement of shutdown function displayed by a separator.

Accordingly, one object of the present disclosure is to provide a composition for a non-aqueous secondary battery functional layer with which it is possible to form a functional layer that can cause a separator to display excellent shutdown function.

Another object of the present disclosure is to provide a functional layer for a non-aqueous secondary battery that can cause a separator to display excellent shutdown function and a non-aqueous secondary battery member that includes the functional layer for a non-aqueous secondary battery.

Yet another object of the present disclosure is to provide a non-aqueous secondary battery that includes the non-aqueous secondary battery member.

Solution to Problem

The inventor conducted diligent investigation with the aim of solving the problem set forth above. The inventor discovered that it is possible to form a functional layer that can cause a separator to display excellent shutdown function by using a composition for a functional layer that contains organic particles containing a polymer that includes an aromatic vinyl monomer unit in not less than a specific proportion and a wax that has a melting point of lower than a specific temperature, and, in this manner, completed the present disclosure.

Specifically, the present disclosure aims to advantageously solve the problem set forth above, and a presently disclosed composition for a non-aqueous secondary battery functional layer comprises organic particles A, wherein the organic particles A contain: a polymer X including an aromatic vinyl monomer unit in a proportion of 20 mass % or more; and a wax having a melting point of lower than 95° C. By using a composition for a non-aqueous secondary battery functional layer that contains the organic particles A containing a polymer including an aromatic vinyl monomer unit in not less than the specific proportion set forth above and a wax having a melting point of lower than the specific temperature set forth above in this manner, it is possible to form a functional layer that can cause a separator to display excellent shutdown function.

Note that the "melting point" of a wax referred to in the present disclosure can be determined by measuring the wax using a differential scanning calorimeter (DSC) under a heating condition of 100° C./min and taking a maximum value of the DSC curve that is obtained.

In the presently disclosed composition for a non-aqueous secondary battery functional layer, the wax is preferably an ester wax. When the wax is an ester wax, an obtained functional layer can cause a separator to display even better shutdown function.

In the presently disclosed composition for a non-aqueous secondary battery functional layer, the melting point of the wax is preferably 40° C. or higher. When the melting point of the wax is not lower than the specific temperature set forth above, a battery member including a functional layer can inhibit blocking (sticking together of battery members via the functional layer) well even in a situation in which the battery member is wound in an overlapping manner.

In the presently disclosed composition for a non-aqueous secondary battery functional layer, the organic particles A preferably have a glass-transition temperature of not lower than 30° C. and not higher than 80° C. When the glass-transition temperature of the organic particles A is within the specific range set forth above, particle stability of the organic particles A in the composition for a functional layer can be increased, and an obtained functional layer can cause a separator to display even better shutdown function. Moreover, when the glass-transition temperature of the organic particles A is within the specific range set forth above, a battery member including a functional layer can inhibit blocking well even in a situation in which the battery member is wound in an overlapping manner.

Note that the "glass-transition temperature" referred to in the present disclosure can be measured by a method described in the EXAMPLES section of the present specification.

In the presently disclosed composition for a non-aqueous secondary battery functional layer, the organic particles A preferably have a core-shell structure including a particulate core portion that contains the polymer X and the wax and a shell portion that at least partially covers the particulate core portion. When the organic particles A have a core-shell structure including a particulate core portion that contains the polymer X and the wax and a shell portion that least partially covers the core portion, particle stability of the organic particles A in the composition for a functional layer can be increased.

Moreover, the present disclosure aims to advantageously solve the problem set forth above, and a presently disclosed method of producing a composition for a non-aqueous secondary battery functional layer is a method of producing a composition for a non-aqueous secondary battery functional layer containing organic particles A, comprising a step A of producing organic particles A containing a polymer X and a wax having a melting point of lower than 95° C., wherein the step A includes a step a1 of suspension polymerizing monomer including an aromatic vinyl monomer in a proportion of 20 mass % or more in water in the presence of the wax to produce the polymer X. By producing a polymer through suspension polymerization of monomer including an aromatic vinyl monomer in not less than the specific proportion set forth above in water in the presence of a wax having a melting point of lower than the specific temperature set forth above so as to produce organic particles containing the polymer and the wax in this manner, it is possible to produce a composition for a non-aqueous secondary battery functional layer with which a functional layer that can cause a separator to display excellent shutdown function can be formed.

In the presently disclosed method of producing a composition for a non-aqueous secondary battery functional layer, the wax is preferably used in an amount of not less than 1 part by mass and not more than 30 parts by mass per 100 parts by mass of the monomer in the step a1. When the amount of the wax that is used in the step a1 is within the range set forth above, particle stability of the organic particles A in the obtained composition for a functional layer can be increased, and a functional layer formed using the composition for a functional layer can cause a separator to display even better shutdown function. Moreover, when the amount of the wax used in the step a1 is within the specific range set forth above, a battery member including a functional layer can inhibit blocking well even in a situation in which the battery member is wound in an overlapping manner.

Furthermore, the present disclosure aims to advantageously solve the problem set forth above, and a presently disclosed functional layer for a non-aqueous secondary battery is formed using any one of the compositions for a non-aqueous secondary battery functional layer set forth above. A functional layer for a non-aqueous secondary battery that is formed using any one of the compositions for a non-aqueous secondary battery functional layer set forth above in this manner can cause a separator to display excellent shutdown function.

Also, the present disclosure aims to advantageously solve the problem set forth above, and a presently disclosed non-aqueous secondary battery member comprises: a substrate; and a functional layer formed on the substrate, wherein the functional layer is the functional layer for a non-aqueous secondary battery set forth above. A non-aqueous secondary battery member such as set forth above includes a functional layer that can cause a separator to display excellent shutdown function.

In the presently disclosed non-aqueous secondary battery member, the substrate is preferably a separator substrate.

Moreover, the present disclosure aims to advantageously solve the problem set forth above, and a presently disclosed non-aqueous secondary battery comprises any one of the non-aqueous secondary battery members set forth above. A non-aqueous secondary battery such as set forth above has excellent shutdown function through a separator and excellent safety as a result of including any one of the non-aqueous secondary battery members set forth above.

Advantageous Effect

According to the present disclosure, it is possible to provide a composition for a non-aqueous secondary battery functional layer with which it is possible to form a functional layer that can cause a separator to display excellent shutdown function.

Moreover, according to the present disclosure, it is possible to provide a functional layer for a non-aqueous secondary battery that can cause a separator to display excellent shutdown function and a non-aqueous secondary battery member that includes the functional layer for a non-aqueous secondary battery.

Furthermore, according to the present disclosure, it is possible to provide a non-aqueous secondary battery that includes the non-aqueous secondary battery member.

DETAILED DESCRIPTION

The following provides a detailed description of embodiments of the present disclosure.

The presently disclosed composition for a non-aqueous secondary battery functional layer is used as a material in production of the presently disclosed functional layer for a non-aqueous secondary battery. Note that the presently disclosed composition for a non-aqueous secondary battery functional layer can be produced by the presently disclosed method of producing a composition for a non-aqueous secondary battery functional layer. Moreover, the presently disclosed functional layer for a non-aqueous secondary battery is formed using the presently disclosed composition for a non-aqueous secondary battery functional layer. The presently disclosed non-aqueous secondary battery member includes the presently disclosed functional layer for a non-aqueous secondary battery. Furthermore, the presently disclosed non-aqueous secondary battery includes at least the presently disclosed non-aqueous secondary battery member.

(Composition for Non-Aqueous Secondary Battery Functional Layer)

The presently disclosed composition for a non-aqueous secondary battery functional layer is a slurry composition in which water serves as a dispersion medium, that contains organic particles A, and that optionally further contains a binder, additives, and so forth. A feature of the presently disclosed composition for a non-aqueous secondary battery functional layer is that the organic particles A contain a polymer X including an aromatic vinyl monomer unit in not less than a specific proportion and a wax having a melting point of lower than a specific temperature.

As a result of the organic particles A in the presently disclosed composition for a non-aqueous secondary battery functional layer containing a polymer X including an aromatic vinyl monomer unit in not less than a specific proportion and a wax having a melting point of lower than a specific temperature, a functional layer that is formed using the composition for a functional layer can cause a separator to display excellent shutdown function inside a secondary battery.

The reason that a separator can be caused to display excellent shutdown function by using a functional layer formed using a composition for a non-aqueous secondary battery functional layer that contains the organic particles A in a secondary battery is presumed to be as follows. Specifically, the organic particles A containing the polymer X that includes an aromatic vinyl monomer unit in not less than a specific proportion and the wax that has a melting point of lower than a specific temperature are thought to suddenly melt and rapidly block micropores of a separator when abnormal heating occurs, and to thereby cause the separator to display excellent shutdown function compared to particles that only contain the polymer X.

<Organic Particles A>

The organic particles A contain a polymer X including an aromatic vinyl monomer unit in not less than a specific proportion and a wax having a melting point of lower than a specific temperature, and optionally contain other components. As a result of the presently disclosed composition for a non-aqueous secondary battery functional layer containing these organic particles A, a functional layer that is formed using the composition for a functional layer can cause a separator to display excellent shutdown function.

<<Polymer X>>

The polymer X is a component that is contained in the organic particles A together with the wax.

The proportional content of an aromatic vinyl monomer unit in the polymer X is required to be 20 mass % or more, is preferably 30 mass % or more, more preferably 40 mass % or more, and even more preferably 50 mass % or more, and is preferably 100 mass % or less, more preferably 84 mass % or less, even more preferably 68 mass % or less, and further preferably 64 mass % or less. When the polymer X includes an aromatic vinyl monomer unit in a proportion that is not less than any of the lower limits set forth above, sufficiently high particle stability of the organic particles A in the composition for a functional layer can be ensured. On the other hand, when the polymer X includes an aromatic vinyl monomer unit in a proportion that is not more than any of the upper limits set forth above, an obtained functional layer can cause a separator to display even better shutdown function.

The phrase "includes a monomer unit" as used in the present disclosure means that "a polymer obtained with the monomer includes a repeating unit derived from the monomer".

Examples of aromatic vinyl monomers that can form an aromatic vinyl monomer unit include, but are not specifically limited to, styrene, α-methylstyrene, vinyltoluene, and divinylbenzene. The use of styrene as an aromatic vinyl monomer is preferable from a viewpoint of increasing particle stability of the organic particles A in the composition for a functional layer. One aromatic vinyl monomer may be used individually, or two or more aromatic vinyl monomers may be used in combination in a freely selected ratio.

The polymer X may also include monomer units other than an aromatic vinyl monomer unit such as described above (hereinafter, also referred to as "other monomer units"). Examples of such other monomer units include, but are not specifically limited to, a (meth)acrylic acid ester monomer unit, a nitrile group-containing monomer unit, and an acid group-containing monomer unit. Note that known monomers can be used as monomers that can form the various monomer units described above. The proportional content of each monomer unit other than an aromatic vinyl monomer unit in the polymer X can be freely set within a range such that the desired effects are obtained.

Note that in the present specification, "(meth)acryl" is used to indicate "acryl" or "methacryl".

<<Wax>>

The wax is a component that is contained in the organic particles A together with the polymer X. The wax contained in the organic particles A enables sudden melting of the organic particles A when abnormal heating occurs as a result of the wax being present together with the polymer X set forth above. Consequently, a functional layer that is formed from the composition for a functional layer containing the organic particles A can cause a separator to display excellent shutdown function.

Note that at least part of the wax normally has a crystal structure in the organic particles A.

The melting point of the wax is required to be lower than 95° C., is preferably 90° C. or lower, more preferably 81° C. or lower, even more preferably 70° C. or lower, and further preferably 60° C. or lower, and is preferably 40° C. or higher, and more preferably 44° C. or higher. When the melting point of the wax is lower than any of the upper limits set forth above, an obtained functional layer can cause a separator to display excellent shutdown function. On the other hand, when the melting point of the wax is not lower than any of the lower limits set forth above, particle stability of the organic particles A in the composition for a functional layer can be increased, and a battery member including a functional layer can inhibit blocking well even in a situation in which the battery member is wound in an overlapping manner.

The wax contained in the organic particles A is not specifically limited so long as the melting point thereof is lower than any of the upper limits set forth above and can be a plant wax, an animal wax, a petroleum wax, a synthetic wax, or a modified product of any thereof.

Specific examples of plant waxes include candelilla wax, carnauba wax, rice bran wax, Japan wax, and jojoba oil.

Specific examples of animal waxes include beeswax.

Specific examples of petroleum waxes include paraffin wax, microcrystalline wax, and petrolatum wax.

Synthetic waxes can be classified as Fischer-Tropsch waxes, polyolefin waxes, ester waxes, and so forth.

Specific examples of polyolefin waxes include polyethylene wax, polypropylene wax, and polybutylene wax.

Either a monohydric alcohol fatty acid ester or a polyhydric alcohol fatty acid ester can be used as an ester wax. Specific examples of monohydric alcohol fatty acid esters include behenyl stearate. Specific examples of polyhydric alcohol fatty acid esters include pentaerythritol esters such as pentaerythritol tetramyristate, pentaerythritol tetrapalmitate, pentaerythritol tetrastearate, pentaerythritol tetralaurate, and pentaerythritol tetrabehenate; and dipentaerythritol esters such as dipentaerythritol hexamyristate, dipentaerythritol hexapalmitate, and dipentaerythritol hexalaurate.

Note that one of these waxes may be used individually, or two or more of these waxes may be used in combination.

The content of the wax in the organic particles A per 100 parts by mass of the polymer X is preferably 1 part by mass or more, more preferably 2 parts by mass or more, even more preferably 5 parts by mass or more, and further preferably 6 parts by mass or more, and is preferably 30 parts by mass or less, more preferably 23 parts by mass or less, even more preferably 15 parts by mass or less, further preferably 12 parts by mass or less, and even further preferably 10 parts by mass or less. When the content of the wax in the organic particles A is not less than any of the lower limits set forth above, an obtained functional layer can cause a separator to display even better shutdown function. On the other hand, when the content of the wax in the organic particles A is not more than any of the upper limits set forth above, particle stability of the organic particles A in the composition for a functional layer can be increased, and a battery member including a functional layer can inhibit blocking well even in a situation in which the battery member is wound in an overlapping manner.

<<Other Components>>

The organic particles A may contain components other than the polymer X and the wax set forth above within a range such that the desired effects are obtained.

In terms of specific examples of other components, a saturated fatty acid zinc salt is preferably used as another component in a case in which an ester wax is used as the wax set forth above, for example, but no specific limitations are made. Note that the saturated fatty acid zinc salt is a different component from the wax set forth above.

The saturated fatty acid zinc salt is used in production of a wax composition that contains the ester wax, for example. More specifically, the ester wax and the saturated fatty acid zinc salt are heated, melted, and uniformly mixed, and are subsequently cooled, solidified, and then pulverized or granulated to produce a wax composition. The obtained wax composition can be used for producing the organic particles A in production of the presently disclosed composition for a functional layer. In a functional layer formed from the composition for a functional layer, organic particles A that have been produced using this wax composition even more suddenly melt and even more rapidly block micropores of a separator when abnormal heating occurs, and thereby enable the separator to display even better shutdown function.

The saturated fatty acid zinc salt is preferably a zinc salt of a monobasic linear saturated fatty acid. When the saturated fatty acid zinc salt is a zinc salt of a monobasic linear saturated fatty acid, an obtained functional layer can cause a separator to display even better shutdown function. The carbon number of the monobasic linear saturated fatty acid is preferably 14 or more, more preferably 16 or more, and even more preferably 18 or more, and is preferably 24 or less. When the carbon number of the monobasic linear saturated fatty acid is not less than any of the lower limits set forth above, an obtained functional layer can cause a separator to display even better shutdown function.

Specific examples of monobasic linear saturated fatty acids include myristic acid (carbon number: 14), palmitic acid (carbon number: 16), stearic acid (carbon number: 18), arachidic acid (carbon number: 20), behenic acid (carbon number: 22), and lignoceric acid (carbon number: 24).

Note that a zinc salt of one of these monobasic linear saturated fatty acids may be used individually, or zinc salts of two or more of these monobasic linear saturated fatty acids may be used in combination.

<<Structure of Organic Particles A>>

Although no specific limitations are placed on the structure of the organic particles A so long as the organic particles A contain the polymer X and the wax set forth above, the polymer X and the wax are normally present in a mixed state in at least part of each of the organic particles A. However, it is not essential that the polymer X and the wax are present uniformly in the organic particles A. At least a portion of the polymer X and at least a portion of the wax are normally compatibly mixed with each other in the organic particles A.

Moreover, the organic particles A may have a core-shell structure including a particulate core portion that contains the polymer X and the wax and a shell portion that at least partially covers the core portion. The shell portion of the organic particles A may partially cover the outer surface of the core portion or may completely cover the outer surface of the core portion. When the organic particles A have a core-shell structure, particle stability of the organic particles A in the composition for a functional layer can be increased.

[Shell Portion]

In a case in which the organic particles A have a core-shell structure, the shell portion of the organic particles A is not specifically limited but is normally formed of a polymer (hereinafter, also referred to as "polymer Y"). Note that the polymer Y forming the shell portion of the organic particles A is normally different from the previously described polymer X.

The polymer Y forming the shell portion of the organic particles A can include known monomer units without any specific limitations. Examples of such known monomer units include a (meth)acrylic acid ester monomer unit and an acid group-containing monomer unit. The proportional content of each monomer unit in the polymer Y can be adjusted within a range such that the desired effects are obtained.

The mass ratio of the content of the polymer Y relative to the content of the polymer X (polymer Y/polymer X) in the organic particles A is preferably 1/20 or more, and more preferably 1/9 or more, and is preferably 1/2 or less. When the mass ratio of the content of the polymer Y relative to the content of the polymer X (polymer Y/polymer X) in the organic particles A is not less than any of the lower limits set forth above, particle stability of the organic particles A in the composition for a functional layer can be further increased. On the other hand, when the mass ratio of the content of the polymer Y relative to the content of the polymer X (polymer Y/polymer X) in the organic particles A is not more than the upper limit set forth above, an obtained functional layer can cause a separator to display sufficiently good shutdown function.

<<Volume-Average Particle Diameter of Organic Particles A>>

The volume-average particle diameter of the organic particles A is preferably 0.1 μm or more, more preferably 0.15 μm or more, and even more preferably 0.2 μm or more, and is preferably 10 μm or less, more preferably 5 μm or less, even more preferably 2 μm or less, and further preferably 1.5 μm or less. When the volume-average particle diameter of the organic particles A is not less than any of the lower limits set forth above, internal resistance of an obtained functional layer can be limited to a low level, and low-temperature output characteristics of a secondary battery can be improved. On the other hand, when the volume-average particle diameter of the organic particles A is not more than any of the upper limits set forth above, adhesiveness of the organic particles A in electrolyte solution can be increased, and high-temperature cycle characteristics of a secondary battery can be improved.

Note that the "volume-average particle diameter" referred to in the present disclosure is a particle diameter (D50) at which, in a particle diameter distribution (by volume) measured by laser diffraction, cumulative volume calculated from a small diameter end of the distribution reaches 50%.

<<Glass-Transition Temperature of Organic Particles A>>

The glass-transition temperature of the organic particles A is preferably 30° C. or higher, more preferably 35° C. or higher, even more preferably 38° C. or higher, and further preferably 40° C. or higher, and is preferably 80° C. or lower, more preferably 70° C. or lower, even more preferably 60° C. or lower, further preferably 53° C. or lower, and even further preferably 46° C. or lower. When the glass-transition temperature of the organic particles A is not lower than any of the lower limits set forth above, particle stability of the organic particles A in the composition for a functional layer can be increased, and a battery member including a functional layer can inhibit blocking well even in a situation in which the battery member is wound in an overlapping manner. On the other hand, when the glass-transition temperature of the organic particles A is not higher than any of the upper limits set forth above, an obtained functional layer can cause a separator to display even better shutdown function.

<Binder>

The presently disclosed composition for a non-aqueous secondary battery functional layer may further contain a binder.

The binder can function as a component that adheres components (organic particles A, etc.) to one another in a functional layer formed using the presently disclosed composition for a functional layer and that enables good adhesion between the functional layer and a substrate (separator substrate or electrode substrate).

Examples of binders that can be used in the presently disclosed composition for a functional layer include known binders. However, the binder is a different component from the previously described organic particles A.

The binder can be an acrylic polymer (polymer including mainly a (meth)acrylic acid ester monomer unit); a fluoropolymer (polymer including mainly a fluorine-containing monomer unit) such as polyvinylidene fluoride (PVdF); an aliphatic conjugated diene/aromatic vinyl copolymer (polymer including mainly an aliphatic conjugated diene monomer unit and an aromatic vinyl monomer unit) such as styrene-butadiene copolymer (SBR) or a hydrogenated product thereof; an aliphatic conjugated diene/acrylonitrile copolymer such as butadiene-acrylonitrile copolymer (NBR) or a hydrogenated product thereof; a polyvinyl alcohol polymer such as polyvinyl alcohol (PVA); or the like depending on the location at which a functional layer is to be provided.

Known monomers can be used as monomers that can form the various monomer units described above. Note that when a polymer is said to "mainly include" one type or a plurality of types of monomer units in the present disclosure, this means that "the proportional content of the one type of monomer unit or the total proportional content of the plurality of types of monomer units is more than 50 mass % when the amount of all monomer units included in the polymer is taken to be 100 mass %".

<<Production of Binder>>

No specific limitations are placed on the method by which the binder is produced. For example, the binder can be produced by polymerizing a monomer composition containing monomers that can form the various monomer units. The method of polymerization is not specifically limited and can be any of solution polymerization, suspension polymerization, bulk polymerization, or emulsion polymerization, for example. The polymerization reaction may be, for example, addition polymerization such as ionic polymerization, radical polymerization, or living radical polymerization. Commonly used emulsifiers, dispersants, polymerization initiators, polymerization aids, and the like may be used in the polymerization in an amount that is also the same as commonly used.

<<Glass-Transition Temperature of Binder>>

The glass-transition temperature of the binder is preferably −75° C. or higher, more preferably −55° C. or higher, even more preferably −35° C. or higher, and further preferably −20° C. or higher, and is preferably 5° C. or lower, more preferably 0° C. or lower, and even more preferably −5° C. or lower. When the glass-transition temperature of the binder is within any of the numerical ranges set forth above, characteristics such as binding capacity of an obtained functional layer can be suitably preserved.

<<Form of Binder>>

Although no specific limitations are placed on the form of the binder, and the binder may have a particulate form or a non-particulate form in the composition for a functional layer, it is preferable that the binder has a particulate form from a viewpoint of forming pores in a functional layer and increasing ion diffusivity inside a battery.

In a case in which the binder has a particulate form, the volume-average particle diameter of the binder is, from a viewpoint of increasing dispersibility of the binder, preferably 0.1 μm or more, and more preferably 0.2 μm or more, and is preferably 0.5 μm or less, more preferably 0.45 μm or less, and even more preferably 0.4 μm or less.

<<Additive Amount of Binder>>

Although no specific limitations are placed on the additive amount of the binder in the presently disclosed composition for a functional layer, the additive amount of the binder per 100 parts by mass of the organic particles A is preferably 0.1 parts by mass or more, and more preferably 0.2 parts by mass or more, and is preferably 50 parts by mass or less, more preferably 40 parts by mass or less, and even more preferably 30 parts by mass or less. When the additive amount of the binder is not less than any of the lower limits set forth above, the strength of an obtained functional layer can be increased. On the other hand, when the additive amount of the binder is not more than any of the upper limits set forth above, ion diffusivity can be sufficiently promoted inside a secondary battery that includes a functional layer.

<Additives>

The composition for a non-aqueous secondary battery functional layer may further contain other optional components in addition to the components set forth above. No specific limitations are placed on these other components so long as they are used in a range such that the desired effects are obtained, and examples thereof include non-conductive particles, surface tension modifiers, dispersants, viscosity modifiers, reinforcing materials, and additives for electrolyte solution. Commonly known components such as non-conductive particles described in JP2015-041606A and surface tension modifiers, dispersants, viscosity modifiers, reinforcing materials, and additives for electrolyte solution described in WO2012/115096A1, for example, can be used as the aforementioned components.

Note that one of these other components may be used individually, or two or more of these other components may be used in combination.

(Method of Producing Composition for Non-Aqueous Secondary Battery Functional Layer)

The presently disclosed method of producing a composition for a non-aqueous secondary battery functional layer is a method of producing a composition for a non-aqueous secondary battery functional layer containing organic particles A. The presently disclosed method of producing a composition for a non-aqueous secondary battery functional layer includes a step A of producing organic particles A containing a polymer X and a wax having a melting point of lower than a specific temperature and optionally includes other steps. Through the presently disclosed method of producing a composition for a non-aqueous secondary battery functional layer, it is possible to produce a composition for a non-aqueous secondary battery functional layer with which a functional layer that can cause a separator to display excellent shutdown function can be formed.

Moreover, the presently disclosed method of producing a composition for a non-aqueous secondary battery functional layer can be used in production of the presently disclosed composition for a non-aqueous secondary battery functional layer set forth above.

<Step A>

In step A, organic particles A containing a polymer X and a wax having a melting point of lower than a specific temperature are produced. Step A includes a step a1 of suspension polymerizing monomer including an aromatic vinyl monomer in not less than a specific proportion in water in the presence of the wax to produce the polymer X and optionally includes other steps.

<<Step a1>>

In step a1, monomer including an aromatic vinyl monomer in not less than a specific proportion is suspension polymerized in water in the presence of the wax having a melting point of lower than a specific temperature to produce the polymer X. By suspension polymerizing the monomer in water in the presence of the wax, droplets containing the wax and the monomer are formed, and then the monomer is polymerized in the droplets to form the polymer X, which enables efficient acquisition of organic particles A containing the polymer X and the wax.

The proportion in which an aromatic vinyl monomer is included among the monomer that is suspension polymerized in step a1 is required to be 20 mass % or more, is preferably 30 mass % or more, more preferably 40 mass % or more, and even more preferably 50 mass % or more, and is preferably 100 mass % or less, more preferably 84 mass % or less, even more preferably 68 mass % or less, and further preferably 64 mass % or less. When the proportion in which an aromatic vinyl monomer is included in the monomer is not less than any of the lower limits set forth above, a functional layer that is formed using an obtained composition for a functional layer can cause a separator to display excellent shutdown function. On the other hand, when the proportion in which an aromatic vinyl monomer is included in the monomer is not more than any of the upper limits set forth above, a functional layer that is formed using an obtained composition for a functional layer can cause a separator to display even better shutdown function.

Note that no specific limitations are placed on monomers other than the aromatic vinyl monomer that are included among the monomer that is suspension polymerized in step a1. For example, any of the monomers that can form the other monomer units previously described in the "Composition for non-aqueous secondary battery functional layer" section can be used. The proportion in which each monomer other than the aromatic vinyl monomer is included among the monomer can be freely adjusted within a range such that the desired effects are obtained.

The wax used in step a1 can be a wax that has a melting point of lower than 95° C. and can, more specifically, be any of waxes previously described in the "Composition for non-aqueous secondary battery functional layer" section.

The amount of the wax that is used in step a1 per 100 parts by mass of the monomer that is used in step a1 is preferably 1 part by mass or more, more preferably 2 parts by mass or more, even more preferably 5 parts by mass or more, and further preferably 6 parts by mass or more, and is preferably 30 parts by mass or less, more preferably 23 parts by mass or less, even more preferably 15 parts by mass or less, further preferably 12 parts by mass or less, and even further preferably 10 parts by mass or less. When the amount of the wax that is used in step a1 is not less than any of the lower limits set forth above, an obtained functional layer can cause a separator to display even better shutdown function. On the other hand, when the amount of the wax that is used in step a1 is not more than any of the upper limits set forth above, particle stability of the organic particles A in a composition for a functional layer can be increased, and a battery member including a functional layer can inhibit blocking well even in a situation in which the battery member is wound in an overlapping manner.

Note that other components may be used in addition to the monomer and the wax set forth above in step a1. Any of the other components that can be contained in the organic particles A in addition to the polymer X and the wax as previously described in the "Composition for non-aqueous secondary battery functional layer" section (for example, saturated fatty acid zinc salts, etc.) can be used as such other components.

Moreover, additives such as dispersion stabilizers, polymerization initiators, and polymerization aids can be used in step a1. These dispersion stabilizers, polymerization initiators, and polymerization aids can be the same as are commonly used and the used amount thereof can also be the same as is commonly used.

From a viewpoint of providing the obtained organic particles A with a more uniform particle diameter distribution, the suspension polymerization is preferably a method in which shear force is applied to a mixture containing the components set forth above, and is more preferably a method in which shear force is applied using an inline emulsifier/disperser.

Note that conditions such as temperature and time in the suspension polymerization are not specifically limited and can be set as appropriate within ranges such that the desired effects are obtained.

<<Other Steps>>

Step A may optionally include other steps besides step a1 set forth above. For example, a step a2 of forming a shell portion of the organic particles A or the like can be implemented as another step.

[Step a2]

In step a2, a shell portion of the organic particles A is formed. Specifically, after the suspension polymerization in step a1, monomer for shell portion formation is added, and a polymer Y is produced in step a2. As a result, the obtained organic particles A have a core-shell structure including a particulate core portion that contains the polymer X and the previously described wax and a shell portion formed of the polymer Y that at least partially covers the core portion.

Note that known monomers can be used as monomers included in the monomer for shell portion formation. More specifically, any of the monomers that can form a monomer unit included in the polymer Y forming the shell portion previously described in the "Composition for non-aqueous secondary battery functional layer" section can be used. The proportional content of each monomer included in the monomer for shell portion formation can be freely adjusted within a range such that the desired effects are obtained.

Moreover, additives such as polymerization initiators and polymerization aids can be used in step a2. These polymerization initiators and polymerization aids can be the same as are commonly used and the used amount thereof can also be the same as is commonly used.

Note that conditions such as temperature and time of the polymerization reaction in step a2 are not specifically limited and can be set as appropriate within ranges such that the desired effects are obtained.

<Other Steps>

The presently disclosed method of producing a composition for a non-aqueous secondary battery functional layer can further include other steps besides step A including step a1, step a2, and the like set forth above.

For example, a mixing step or the like can be implemented as another step.

<<Mixing Step>>

In the mixing step, the organic particles A obtained through step A set forth above are mixed with an optional binder, additive, and/or the like in the presence of water as a dispersion medium to produce a composition for a functional layer.

Moreover, after mixing of a dispersion liquid of the organic particles A and a dispersion liquid of the binder, the resultant mixture is typically diluted using water as a dispersion medium so as to adjust the solid content concentration as appropriate, and thereby produce a composition for a functional layer.

Known mixing methods can be adopted without any specific limitations as the method by which the components set forth above are mixed.

Moreover, no specific limitations are placed on binders and additives that can be used. For example, any of the binders and additives previously described in the "Composition for non-aqueous secondary battery functional layer" section can be used.

(Functional Layer for Non-Aqueous Secondary Battery)

The presently disclosed functional layer for a non-aqueous secondary battery is a layer that is formed from the composition for a non-aqueous secondary battery functional layer set forth above. The presently disclosed functional layer for a non-aqueous secondary battery can be formed, for example, by applying the above-described composition for a functional layer onto the surface of a suitable substrate to form a coating film, and then drying the coating film that is formed. In other words, the presently disclosed functional layer for a non-aqueous secondary battery is formed of a dried product of the composition for a non-aqueous secondary battery functional layer set forth above and normally contains organic particles A containing a polymer X that includes an aromatic vinyl monomer unit in not less than a specific proportion and a wax that has a melting point of lower than a specific temperature.

The presently disclosed functional layer for a non-aqueous secondary battery can cause a separator to display excellent shutdown function as a result of being formed using the composition for a non-aqueous secondary battery functional layer set forth above.

Note that the presently disclosed functional layer for a non-aqueous secondary battery may, without any specific limitations, be used as an adhesive layer that does not contain non-conductive particles or as a porous membrane layer that contains non-conductive particles.

<Substrate>

No limitations are placed on the substrate onto which the composition for a functional layer is applied. For example, a coating film of the composition for a functional layer may be formed on the surface of a releasable substrate, the coating film may be dried to form a functional layer, and then the releasable substrate may be peeled from the functional layer. The functional layer that is peeled from the releasable substrate in this manner can be used as a free-standing film in formation of a battery member of a secondary battery. Specifically, the functional layer that is peeled from the releasable substrate may be stacked on a separator substrate to form a separator including the functional layer or may be stacked on an electrode substrate to form an electrode including the functional layer.

However, it is preferable that a separator substrate or an electrode substrate is used as the substrate from a viewpoint of raising battery member production efficiency since a step of peeling the functional layer can be omitted. The functional layer provided on the separator substrate or electrode substrate can suitably be used as a protective layer for improving heat resistance, strength, and the like of a separator or an electrode.

<<Separator Substrate>>

The separator substrate is not specifically limited and may be a known separator substrate such as an organic separator substrate. The organic separator substrate is a porous member that is made from an organic material. The organic separator substrate may, for example, be a microporous membrane or non-woven fabric containing a polyolefin resin such as polyethylene or polypropylene, or an aromatic polyamide resin, and is preferably a microporous membrane or non-woven fabric made from polyethylene due to the excellent strength thereof. Although the separator substrate may be of any thickness, the thickness thereof is preferably not less than 5 μm and not more than 30 μm, more preferably not less than 5 μm and not more than 20 μm, and even more preferably not less than 5 μm and not more than 18 μm. A separator substrate thickness of 5 μm or more enables sufficient safety. Moreover, a separator substrate thickness of 30 μm or less can inhibit reduction of ion conductivity and deterioration of secondary battery output characteristics, and can also inhibit increase of heat shrinkage force of the separator substrate and improve heat resistance.

<<Electrode Substrate>>

The electrode substrate (positive/negative electrode substrate) is not specifically limited and may, for example, be an electrode substrate obtained by forming an electrode mixed material layer on a current collector.

Note that the current collector, the electrode active material (positive/negative electrode active material) and binder for an electrode mixed material layer (binder for positive/negative electrode mixed material layer) in the electrode mixed material layer, and the method by which the electrode mixed material layer is formed on the current collector can be known examples thereof such as any of those described in JP2013-145763A, for example.

<Formation Method of Functional Layer for Non-Aqueous Secondary Battery>

Examples of methods by which the functional layer may be formed on a substrate such as the separator substrate or the electrode substrate set forth above include:

(1) a method in which the presently disclosed composition for a non-aqueous secondary battery functional layer is applied onto the surface of a separator substrate or an electrode substrate (surface at the electrode mixed material layer side in the case of an electrode substrate; same applies below) and is then dried;

(2) a method in which a separator substrate or an electrode substrate is immersed in the presently disclosed composition for a non-aqueous secondary battery functional layer and is subsequently dried; and (3) a method in which the presently disclosed composition for a non-aqueous secondary battery functional layer is applied onto a releasable substrate and is dried to produce a functional layer that is then transferred onto the surface of a separator substrate or an electrode substrate.

Of these methods, method (1) is particularly preferable since it allows simple control of the thickness of the functional layer. More specifically, method (1) includes a step of applying the composition for a functional layer onto a substrate (application step) and a step of drying the composition for a functional layer that has been applied onto the substrate to form a functional layer (functional layer formation step).

[Application Step]

Examples of methods by which the composition for a functional layer can be applied onto the substrate in the application step include, but are not specifically limited to, doctor blading, reverse roll coating, direct roll coating, gravure coating, extrusion coating, and brush coating.

[Functional Layer Formation Step]

The composition for a functional layer on the substrate may be dried by any commonly known method in the functional layer formation step, without any specific limitations. For example, the drying method may be drying by warm, hot, or low-humidity air; drying in a vacuum; or drying by irradiation with infrared light, electron beams, or the like. Although no specific limitations are placed on the drying conditions, the drying temperature is preferably 50° C. to 150° C., and the drying time is preferably 3 minutes to 30 minutes.

The mass per unit area of the functional layer that is obtained after drying is preferably 0.1 g/m$^2$ or more, more preferably 0.15 g/m$^2$ or more, and even more preferably 0.2 g/m$^2$ or more, and is preferably 1.0 g/m$^2$ or less, more preferably 0.8 g/m$^2$ or less, and even more preferably 0.6 g/m$^2$ or less. When the mass per unit area of the functional layer obtained after drying is not less than any of the lower limits set forth above, the obtained functional layer can cause a separator to display even better shutdown function. On the other hand, when the mass per unit area of the functional layer obtained after drying is not more than any of the upper limits set forth above, internal resistance of the obtained functional layer can be limited to a low level, and low-temperature output characteristics of a secondary battery can be improved.

(Non-Aqueous Secondary Battery Member)

The presently disclosed non-aqueous secondary battery member includes a substrate and a functional layer formed on the substrate. A feature of the presently disclosed non-aqueous secondary battery member is that the functional layer is the presently disclosed functional layer for a non-aqueous secondary battery set forth above.

Consequently, the presently disclosed non-aqueous secondary battery member includes a functional layer that can cause a separator to display excellent shutdown function.

The substrate can be any of the substrates that were previously described in the "Functional layer for non-aqueous secondary battery" section. Moreover, it is preferable that a separator substrate is used as the substrate of the presently disclosed non-aqueous secondary battery member.

The presently disclosed non-aqueous secondary battery member may, in addition to the substrate (separator substrate or electrode substrate) and the presently disclosed functional layer, include constituent elements other than the functional layer set forth above so long as the effects disclosed herein are not significantly lost.

These constituent elements other than the presently disclosed functional layer may be any constituent elements that do not correspond to the presently disclosed functional layer without any specific limitations, and one example thereof is an adhesive layer for adhering battery members to each other that may be provided on the presently disclosed functional layer.

However, in a case in which the substrate used in the presently disclosed non-aqueous secondary battery member is a separator substrate, it is preferable that the separator substrate and the functional layer set forth above are in direct contact and that another constituent element is not present therebetween. When the separator substrate and the functional layer set forth above are in direct contact, organic particles A that have melted at high temperature can easily and rapidly block micropores of the separator substrate, and thus a separator can display even better shutdown function.

Moreover, in a case in which the substrate used in the presently disclosed non-aqueous secondary battery member is an electrode substrate, the functional layer set forth above preferably constitutes an outermost layer of the presently disclosed non-aqueous secondary battery member. When the functional layer set forth above constitutes an outermost layer of the presently disclosed non-aqueous secondary battery member, it is possible for the functional layer set forth above to be in direct contact with a separator in a situation in which a secondary battery is produced using the presently disclosed battery member. In this situation, organic particles A that have melted at high temperature can easily and rapidly block micropores of the separator substrate, and thus the separator can display even better shutdown function.

(Non-Aqueous Secondary Battery)

A feature of the presently disclosed non-aqueous secondary battery is that it includes the presently disclosed non-aqueous secondary battery member set forth above. More specifically, the presently disclosed non-aqueous secondary battery includes a positive electrode, a negative electrode, a separator, and an electrolyte solution, and has the presently disclosed non-aqueous secondary battery member as at least one of the positive electrode, the negative electrode, and the separator. The presently disclosed non-aqueous secondary battery has excellent shutdown function through the separator and excellent safety as a result of including the presently disclosed non-aqueous secondary battery member set forth above. Note that in the presently disclosed non-aqueous secondary battery, it is preferable that the separator is the presently disclosed non-aqueous secondary battery member.

Moreover, the presently disclosed non-aqueous secondary battery includes the presently disclosed functional layer set forth above since it includes the presently disclosed non-aqueous secondary battery member. Also note that in the presently disclosed non-aqueous secondary battery, it is preferable that the presently disclosed functional layer and a separator substrate are in direct contact. When the presently disclosed functional layer and a separator substrate are in direct contact in the presently disclosed non-aqueous secondary battery, organic particles A that have melted at high temperature can easily and rapidly block micropores of the separator substrate, and thus the separator can display even better shutdown function.

<Positive Electrode, Negative Electrode, and Separator>

At least one of the positive electrode, the negative electrode, and the separator used in the presently disclosed secondary battery is the presently disclosed non-aqueous secondary battery member set forth above.

Note that in the case of a positive electrode, negative electrode, or separator that is not the presently disclosed non-aqueous secondary battery member, no specific limitations are made, and an electrode formed of an electrode substrate such as previously described in the "Functional layer for non-aqueous secondary battery" section or a separator formed of a separator substrate such as previously described in the "Functional layer for non-aqueous secondary battery" section can be used.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents in the case of a lithium ion secondary battery, for example, include carbonates such as dimethyl carbonate (DMC), ethylene carbonate (EC), diethyl carbonate (DEC), propylene carbonate (PC), butylene carbonate (BC), methyl ethyl carbonate (MEC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution can be adjusted as appropriate. Furthermore, known additives may be added to the electrolyte solution.

(Production Method of Non-Aqueous Secondary Battery)

The presently disclosed non-aqueous secondary battery can be produced by, for example, stacking the positive electrode and the negative electrode with the separator in-between, performing rolling, folding, or the like, as necessary, of the resultant laminate to place the laminate in a battery container, injecting the electrolyte solution into the battery container, and sealing the battery container. Note that at least one battery member among the positive electrode, the negative electrode, and the separator is the presently disclosed non-aqueous secondary battery member set forth above. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to these examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the examples and comparative examples, the following methods were used to measure and evaluate the glass-transition temperature and volume-average particle diameter D50 of a binder and organic particles A, the particle stability of organic particles A, and the blocking resistance and shutdown capability of a separator.

<Glass-Transition Temperature>

Binders and organic particles A produced in the examples and comparative examples were used as measurement samples. For each of the measurement samples, 10 mg of the measurement sample was measured into an aluminum pan and was measured by a differential scanning calorimeter (EXSTAR DSC6220 produced by SII NanoTechnology Inc.) under conditions prescribed by JIS Z 8703 with a measurement temperature range of −100° C. to 500° C. and a heating rate of 10° C./min, and using an empty aluminum pan as a reference, to obtain a differential scanning calorimetry (DSC) curve. In the heating process, an intersection point of a baseline directly before a heat absorption peak on the DSC curve at which a derivative signal (DDSC) reached 0.05 mW/min/mg or more and a tangent to the DSC curve at a first inflection point to appear after the heat absorption peak was determined as the glass-transition temperature (° C.).

<Volume-Average Particle Diameter D50>

For binders and organic particles A produced in the examples and comparative examples, a laser diffraction particle diameter distribution analyzer (produced by Beckman Coulter, Inc.; product name: LS-230) was used to measure a particle size distribution (by volume) with respect to a water dispersion solution of the binder or organic particles A that had been adjusted to a solid content concentration of 0.1 mass %, and the volume-average particle diameter D50 of the binder or organic particles A was determined as a particle diameter (μm) at which cumulative volume calculated from a small diameter end of the distribution reached 50%.

<Particle Stability of Organic Particles A>

A mass W0 in terms of solid content of a composition for a functional layer produced in each example or comparative example was passed through a 200 mesh. Thereafter, the dry mass W1 of a residue on the mesh was measured. The amount of mesh residue (ppm) was calculated by the following formula.

Amount of mesh residue(ppm)=($W1/W0$)×1,000,000

The calculated amount of mesh residue was evaluated by the following standard. A smaller value for the amount of mesh residue indicates that organic particles A have better particle stability in the composition for a functional layer.
A: Amount of mesh residue of less than 500 ppm
B: Amount of mesh residue of not less than 500 ppm and less than 1,000 ppm
C: Amount of mesh residue of not less than 1,000 ppm and less than 2,000 ppm
D: Amount of mesh residue of not less than 2,000 ppm and less than 5,000 ppm
E: Amount of mesh residue of 5,000 ppm or more <Blocking Resistance of Separator>

Two pieces having a size of 4 cm in width by 4 cm in length were cut out from a separator produced in each example or comparative example for use as test specimens. The surfaces of the two test specimens at which functional layers were present were stacked on each other and pressing thereof was performed under conditions of a temperature of 40° C., a pressure of 5 MPa, and a time of 2 minutes. After this pressing, the stress (blocking strength) when the stacked test specimens were peeled apart by pulling vertically upward at a pulling speed of 50 mm/min was measured. The determined blocking strength was evaluated by the following standard. A smaller blocking strength indicates that a separator that includes a functional layer can inhibit blocking well.
A: Less than 4 N/m
B: Not less than 4 N/m and less than 6 N/m
C: Not less than 6 N/m and less than 8 N/m
D: Not less than 8 N/m and less than 10 N/m
E: 10 N/m or more <Shutdown Capability of Separator>

A Gurley meter (SMOOTH & POROSITY METER produced by Kumagai Riki Kogyo Co., Ltd. (measurement diameter: 02.9 cm)) was used to measure the Gurley value G1 (s/100 cc) of a separator produced in each example or comparative example before heating of the separator. Thereafter, the separator was heated for 30 seconds on a hot plate heated to 130° C. with the surface of the separator at which a functional layer was present facing upward. The Gurley value G2 (s/100 cc) after heating was measured in the same manner as described above. The rate of increase (%) of the Gurley value between before and after heating was calculated by the following formula.

Rate of increase of Gurley value (%)={($G2-G1$)/$G1$}×100

The determined rate of increase of the Gurley value was evaluated by the following standard. A larger rate of increase of the Gurley value between before and after heating indicates that permeability of the separator decreases well in a short time at high temperature and that the separator can display excellent shutdown function.
A: Rate of increase of Gurley value of 500% or more
B: Rate of increase of Gurley value of not less than 400% and less than 500%
C: Rate of increase of Gurley value of not less than 300% and less than 400%
D: Rate of increase of Gurley value of not less than 200% and less than 300%
E: Rate of increase of Gurley value of not less than 100% and less than 200%

Production Example 1: Production of Wax Composition 1

<Production of Ester Wax>

A four-neck flask of 0.5 L in capacity to which a nitrogen feeding tube, an impeller, and a condenser were attached was charged with 18 g (0.13 mol) of pentaerythritol and 104 g (0.52 mol) of lauric acid. A reaction was carried out at 220° C. for 10 hours under a stream of nitrogen while evaporating produced water. Next, 46.5 g of toluene, 32 g of 2-propanol, and 19 g of 10% potassium hydroxide aqueous solution containing potassium hydroxide in an amount of 2.0 equivalents of the acid value were added, the contents of the flask were stirred at 70° C. for 30 minutes, and then the contents were left to settle for 30 minutes, after which, an aqueous layer portion was removed to obtain a crude product.

Water washing of 100 parts by mass of the crude product was performed four times at 70° C. using 40 parts by mass of deionized water, and the pH was adjusted to 7. Solvent was evaporated from the resultant purified product under heated and reduced pressure conditions, and then filtration, solidification, and pulverization were performed to yield 140 g of pentaerythritol tetralaurate (melting point: 44° C.) as an ester wax 1.

<Production of Saturated Fatty Acid Zinc Salt>

A separable flask of 3 L in capacity to which an impeller was attached was charged with 306 g (0.90 mol) of behenic acid as a monobasic linear saturated fatty acid and 2,500 g of water, and these materials were heated to 90° C. Next, 75 g (0.90 mol) of 48% sodium hydroxide aqueous solution was added and was stirred therewith at 90° C. for 1 hour. Thereafter, 291 g (0.45 mol) of 25% zinc sulfate aqueous solution was added dropwise over 1 hour. A further 1 hour of stirring was performed after completion of this dropwise addition.

Next, 1,500 g of water was added to the resultant slurry, and cooling was performed to 65° C. Thereafter, suction filtration was performed, water washing was performed twice with 1,000 g of water, and drying was performed at 65° C. for 48 hours using a fan dryer to yield zinc behenate as a saturated fatty acid zinc salt.

<Production of Wax Composition 1>

A separable flask of 0.3 L in capacity to which an impeller and a nitrogen feeding tube were attached was charged with 199.0 g of the ester wax 1 and 1.0 g of the zinc behenate, and stirring thereof was performed at 150° C. for 1 hour under a stream of nitrogen. Thereafter, cooling, solidification, and pulverization were performed to yield a wax composition 1.

Production Example 2: Production of Wax Composition 2

A wax composition 2 containing pentaerythritol tetrabehenate (melting point: 81° C.) as an ester wax 2 and zinc behenate was obtained in the same way as in Production Example 1 with the exception that behenic acid was used instead of lauric acid in production of the ester wax.

Example 1

<Production of Binder>

A reactor including a stirrer was charged with 70 parts of deionized water, 0.15 parts of polyoxyethylene lauryl ether (EMULGEN® 120 (EMULGEN is a registered trademark in Japan, other countries, or both) produced by Kao Corporation) as an emulsifier, and 0.5 parts of ammonium persulfate, the gas phase was purged with nitrogen gas, and heating was performed to 60° C.

Meanwhile, a monomer composition was obtained in a separate vessel by mixing 50 parts of deionized water, 0.5 parts of polyoxyethylene lauryl ether (EMULGEN® 120 produced by Kao Corporation) as an emulsifier, 70 parts of 2-ethylhexyl acrylate (2-EHA) as a (meth)acrylic acid ester monomer, 25 parts of styrene (ST) as an aromatic vinyl monomer, 1.7 parts of allyl glycidyl ether (AGE; hydrophilic cross-linker) as a cross-linkable monomer, 0.3 parts of allyl methacrylate (AMA: hydrophobic cross-linker) as a cross-linkable monomer, and 3 parts of acrylic acid (AA) as an acidic group-containing monomer. The monomer composition was continuously added into the reactor over 4 hours to carry out polymerization. The reaction was carried out at 70° C. during the addition. After completion of the addition, a further 3 hours of stirring was performed at 80° C. to complete the reaction and thereby produce a water dispersion containing a particulate acrylic polymer as a binder.

Upon measurement of the glass-transition temperature of the obtained binder, only one glass-transition temperature (−20° C.) was observed, and the particulate acrylic polymer constituting the binder was confirmed to be a random copolymer. The volume-average particle diameter D50 of the obtained binder was 0.2 μm.

<Production of Organic Particles A>

Mixing was performed of 64 parts of styrene as an aromatic vinyl monomer, 33 parts of 2-ethylhexyl acrylate as a (meth)acrylic acid ester monomer, and 3 parts of methacrylic acid as an acid group-containing monomer. In addition, 10 parts of the wax composition 1 obtained in Production Example 1 (9.95 parts in terms of the ester wax 1) was mixed therewith and dissolved to obtain a mixture.

A reactor including a stirrer was charged with 400 parts of deionized water and 0.5 parts of sodium dodecylbenzenesulfonate as a dispersion stabilizer, the mixture described above was subsequently added under stirring, 2 parts of t-butyl peroxy-2-ethylhexanoate (produced by NOF Corporation; product name: PERBUTYL O) was subsequently added as a polymerization initiator, and then high-shear stirring was performed for 10 minutes at a rotation speed of 15,000 rpm using an inline emulsifier/disperser (produced by Pacific Machinery & Engineering Co., Ltd.; product name: Milder) to cause droplet formation.

The resultant dispersion liquid of droplets was loaded into a reactor, was heated to 90° C., and a polymerization reaction was carried out for 5 hours to yield organic particles A.

The glass-transition temperature and volume-average particle diameter D50 of the obtained organic particles A were measured. The results are shown in Table 1.

<Production of Composition for Functional Layer>

After mixing 11 parts of the binder with 110 parts of the organic particles A obtained as described above, the resultant mixture was diluted using deionized water to obtain a composition for a functional layer (solid content concentration: 10%) in the form of a slurry. The obtained composition for a functional layer was used to evaluate the particle stability of the organic particles A. The result is shown in Table 1.

<Production of Separator>

A microporous membrane (thickness: 12 μm; Gurley value: 100 s/100 cc) made of polyethylene was prepared as a separator substrate. The composition for a functional layer obtained as described above was applied onto one side of the prepared separator substrate by bar coating such as to have a mass per unit area after drying of 0.5 g/m². Next, the separator with the composition for a functional layer applied thereon was dried at 50° C. for 1 minute to obtain a separator including a functional layer at one side.

The obtained separator was used to evaluate blocking resistance and shutdown capability. The results are shown in Table 1.

Examples 2 to 4

Various operations, measurements, and evaluations were performed in the same way as in Example 1 with the exception that the additive amount of the wax composition 1 in production of the organic particles A was changed from 10 parts (9.95 parts in terms of the ester wax 1) to 5 parts (4.975 parts in terms of the ester wax 1), 15 parts (14.925 parts in terms of the ester wax 1), or 20 parts (19.9 parts in terms of the ester wax 1). The results are shown in Table 1.

Example 5

Various operations, measurements, and evaluations were performed in the same way as in Example 1 with the exception that organic particles A produced as described below were used. The results are shown in Table 1.

<Production of Organic Particles A>

Mixing was performed of 57.6 parts of styrene as an aromatic vinyl monomer, 29.7 parts of 2-ethylhexyl acrylate as a (meth)acrylic acid ester monomer, and 2.7 parts of methacrylic acid as an acid group-containing monomer. In addition, 20 parts of the wax composition 1 (19.9 parts in terms of the ester wax 1) was mixed therewith and was dissolved to obtain a mixture.

A reactor including a stirrer was charged with 400 parts of deionized water and 0.5 parts of sodium dodecylbenzenesulfonate as a dispersion stabilizer, the mixture described above was subsequently added under stirring, 2 parts of t-butyl peroxy-2-ethylhexanoate (produced by NOF Corporation; product name: PERBUTYL O) was subsequently added as a polymerization initiator, and then high-shear stirring was performed for 10 minutes at a rotation speed of 15,000 rpm using an inline emulsifier/disperser (produced by Pacific Machinery & Engineering Co., Ltd.; product name: Milder) to cause droplet formation.

The resultant dispersion liquid of droplets was loaded into a reactor and was heated to 90° C. At the point at which the reaction conversion rate reached 99%, monomer for shell portion formation including 9.9 parts of methyl methacrylate as a (meth)acrylic acid ester monomer and 0.1 parts of methacrylic acid as an acid group-containing monomer, and 0.1 parts of 2,2'-azobis(2-methyl-N-(2-hydroxyethyl)-propionamide) (produced by Wako Pure Chemical Industries, Ltd.; product name: VA-086; water-soluble) as a polymerization initiator for shell portion formation dissolved in 10 parts of deionized water were added, and the reaction was continued at 90° C. for 4 hours to yield organic particles A.

The obtained organic particles A had a core-shell structure including a core portion and a shell portion formed of a polymer Y that partially covered an outer surface of the core portion.

Examples 6 and 7

Various operations, measurements, and evaluations were performed in the same way as in Example 1 with the exception that behenyl stearate (melting point: 70° C.) or the wax composition 2 obtained in Production Example 2 was used instead of the wax composition 1 in production of the organic particles A. The results are shown in Table 1.

Examples 8 to 12

Various operations, measurements, and evaluations were performed in the same way as in Example 1 with the exception that the chemical composition of monomers used in production of the organic particles A was changed as shown in Table 1. The results are shown in Table 1.

Example 13

Various operations, measurements, and evaluations were performed in the same way as in Example 1 with the exception that 5 parts of paraffin wax (produced by Nippon Seiro Co., Ltd.; product name: HNP-11) having a melting point of 68° C. was mixed instead of mixing 10 parts of the wax composition 1 in production of the organic particles A. The results are shown in Table 1.

Comparative Example 1

Various operations, measurements, and evaluations were performed in the same way as in Example 1 with the exception that the wax composition 1 was not added in production of the organic particles A. The results are shown in Table 1.

Comparative Example 2

Various operations, measurements, and evaluations were performed in the same way as in Example 1 with the exception that in production of the composition for a functional layer in Comparative Example 1, 10 parts of the wax composition 1 was separately added when mixing 10 parts of the binder with 100 parts of the obtained organic particles A. The results are shown in Table 1.

Comparative Example 3

Various operations, measurements, and evaluations were performed in the same way as in Example 1 with the exception that organic particles A produced as described below were used. The results are shown in Table 1.

<Production of Organic Particles A>

A polymerization tank A was charged with 100 parts of deionized water and 100 parts in terms of solid content of a 30% aqueous emulsion of polyethylene wax (melting point: 95° C.; number-average molecular weight: 7,300) as a wax, 0.2 parts of ammonium persulfate as a polymerization initiator and 10 parts of deionized water were further added, and heating was performed to 70° C. Moreover, 30 parts of deionized water, 17 parts of 2-ethylhexyl acrylate as a (meth)acrylic acid ester monomer, 31 parts of styrene as an aromatic vinyl monomer, and 2 parts of methacrylic acid as an acid group-containing monomer were loaded into a separate polymerization tank B, and 2 parts in terms of solid content of a 20% aqueous solution of ammonium polyoxyalkylene alkenyl ether sulfate as a dispersion stabilizer was added thereto. The contents of the polymerization tank B were sufficiently stirred and were then continuously added into the polymerization tank A over 120 minutes. Moreover, a polymerization reaction was continued while maintaining a temperature of 70° C. until the polymerization conversion rate reached 98%. Cooling was performed to quench the reaction and yield a water dispersion of organic particles A. In the obtained organic particles A, a polymer was substantially partially disposed at the outside of a particle formed of the wax.

Note that in the table:

"ST" indicates styrene;
"2-EHA" indicates 2-ethylhexyl acrylate;
"BA" indicates butyl acrylate;
"MMA" indicates methyl methacrylate;
"AN" indicates acrylonitrile; and
"MAA" indicates methacrylic acid.

TABLE 1

| | | | Example 1 | Example 2 | Example 3 | Example 4 | Example 5 | Example 6 | Example 7 | Example 8 |
|---|---|---|---|---|---|---|---|---|---|---|
| Organic particles A | Polymer X | Chemical composition (mass %) | Aromatic vinyl monomer | ST | 64 | 64 | 64 | 64 | 64 | 64 | 64 | 50 |
| | | | Other (Meth)acrylic acid ester monomer | 2-EHA | 33 | 33 | 33 | 33 | 33 | 33 | 33 | — |
| | | | | BA | — | — | — | — | — | — | — | 37 |
| | | | | MMA | — | — | — | — | — | — | — | — |
| | | monomers | Nitrile group-containing monomer | AN | — | — | — | — | — | — | — | 10 |
| | | | Acid group-containing monomer | MAA | 3 | 3 | 3 | 3 | 3 | 3 | 3 | 3 |
| | | Additive amount of all monomer (parts by mass) | | | 100 | 100 | 100 | 100 | 90 | 100 | 100 | 100 |
| | Wax | Additive amount (parts by mass) | Pentaerythritol tetralaurate | | 9.95 | 4.975 | 14.925 | 19.9 | 19.9 | — | — | 9.95 |
| | | | Pentaerythritol tetrabehenate | | — | — | — | — | — | — | 9.95 | — |
| | | | Behenyl stearate | | — | — | — | — | — | 10 | — | — |
| | | | Paraffin wax | | — | — | — | — | — | — | — | — |
| | | | Polyethylene wax | | — | — | — | — | — | — | — | — |
| | | Melting point (° C.) | | | 44 | 44 | 44 | 44 | 44 | 70 | 81 | 44 |
| | Saturated fatty acid zinc salt | Additive amount (parts by mass) | Zinc behenate | | 0.05 | 0.025 | 0.075 | 0.1 | 0.1 | — | 0.05 | 0.05 |
| | Polymer Y of shell portion | Chemical composition (mass %) | (Meth)acrylic acid ester monomer | MMA | — | — | — | — | 99 | — | — | — |
| | | | Acid group-containing monomer | MAA | — | — | — | — | 1 | — | — | — |
| | | Additive amount of all monomer for shell portion formation (parts by mass) | | | — | — | — | — | 10 | — | — | — |
| | | Mass ratio (polymer Y/polymer X) | | | — | — | — | — | 1/9 | — | — | — |
| | | Glass-transition temperature (° C.) | | | 41 | 44 | 38 | 34 | 34 | 43 | 52 | 43 |
| | | Volume-average particle diameter (μm) | | | 1.4 | 1.4 | 1.4 | 1.4 | 1.4 | 1.4 | 1.4 | 1.3 |
| | Additive amount of organic particles A (parts by mass) | | | | 110 | 105 | 115 | 120 | 120 | 110 | 110 | 110 |
| Wax composition (separately added) | Wax | Additive amount (parts by mass) | Pentaerythritol tetralaurate | | — | — | — | — | — | — | — | — |
| | | Melting point (° C.) | | | — | — | — | — | — | — | — | — |
| | Saturated fatty acid zinc salt | Additive amount (parts by mass) | Zinc behenate | | — | — | — | — | — | — | — | — |
| Binder | Type | | | | Acrylic polymer | Acrylic polymer | Acrylic polymer | Acrylic polymer | Acrylic polymer | Acrylic polymer | Acrylic polymer | Acrylic polymer |
| | Volume-average particle diameter (μm) | | | | 0.2 | 0.2 | 0.2 | 0.2 | 0.2 | 0.2 | 0.2 | 0.2 |
| | Glass-transition temperature (° C.) | | | | −20 | −20 | −20 | −20 | −20 | −20 | −20 | −20 |
| | Additive amount (parts by mass) | | | | 11 | 11 | 11 | 11 | 11 | 11 | 11 | 11 |
| | Permeability of separator | | | | A | A | A | A | A | B | C | A |
| | Particle stability of organic particles A | | | | A | A | B | C | A | A | A | A |
| | Blocking resistance of separator | | | | A | A | B | C | A | A | A | A |

TABLE 1-continued

| | | | | Example 9 | Example 10 | Example 11 | Example 12 | Example 13 | Example 14 | Comparative Example 1 | Comparative Example 2 | Comparative Example 3 |
|---|---|---|---|---|---|---|---|---|---|---|---|---|
| Organic particles A | Polymer X | Chemical composition (mass %) | Aromatic vinyl monomer ST | 56 | 70 | 86 | 20 | 64 | 64 | 64 | 64 | 62 |
| | | | (Meth)acrylic acid ester monomer 2-EHA | 34 | 27 | 11 | — | 33 | 33 | 33 | 33 | 34 |
| | | | BA | — | — | — | 33 | — | — | — | — | — |
| | | | MMA | — | — | — | 44 | — | — | — | — | — |
| | | Other monomers | Nitrile group-containing monomer AN | 7 | — | — | — | — | — | — | — | — |
| | | | Acid group-containing monomer MAA | 3 | 3 | 3 | 3 | 3 | 3 | 3 | 3 | 4 |
| | | Additive amount of all monomer (parts by mass) | | 100 | 100 | 100 | 100 | 100 | 100 | 100 | 100 | 50 |
| | | Additive amount (parts by mass) | Pentaerythritol tetralaurate | 9.95 | 9.95 | 9.95 | 9.95 | — | — | — | — | — |
| | | | Pentaerythritol tetrabehenate | — | — | — | — | — | — | — | — | — |
| | | | Behenyl stearate | — | — | — | — | — | — | — | — | — |
| | | | Paraffin wax | — | — | — | — | 5 | — | — | — | — |
| | | | Polyethylene wax | — | — | — | — | — | — | — | — | 100 |
| | Saturated fatty acid zinc salt | Additive amount (parts by mass) | Zinc behenate | — | — | — | — | 68 | — | — | — | 95 |
| | | Melting point (° C.) | | — | — | — | — | — | — | — | — | — |
| | Polymer Y of shell portion | Chemical composition (mass %) | (Meth)acrylic acid ester monomer MMA | — | — | — | — | — | — | — | — | — |
| | | Acid group-containing monomer | | — | — | — | — | — | — | — | — | — |
| | | Additive amount of all monomer for shell portion formation (parts by mass) | | — | — | — | — | — | — | — | — | — |
| | Mass ratio (polymer Y/polymer X) | | | — | — | — | — | — | — | — | — | — |
| | Glass-transition temperature (° C.) | | | 44 | 44 | 44 | 44 | 42 | 55 | 55 | 55 | 55 |
| | Volume-average particle diameter (μm) | | | 1.4 | 1.4 | 1.4 | 1.4 | 1.5 | 1.4 | 1.4 | 1.4 | 0.6 |
| | Additive amount of organic particles A (parts by mass) | | | 110 | 110 | 110 | 110 | 105 | 100 | 100 | 100 | 150 |
| Wax composition (separately added) | | | Pentaerythritol tetralaurate | — | — | — | — | — | — | — | — | — |
| | Melting point (° C.) | | | — | — | — | — | — | — | — | 44 | — |
| | Saturated fatty acid zinc salt | Additive amount (parts by mass) | | 0.05 | 0.05 | 0.05 | 0.05 | — | — | — | 0.05 | — |
| | | | | — | — | — | — | — | — | — | 9.95 | — |
| Binder | Type | | | Acrylic polymer | Acrylic polymer | Acrylic polymer | Acrylic polymer | Acrylic polymer | Acrylic polymer | Acrylic polymer | Acrylic polymer | Acrylic polymer |
| | Volume-average particle diameter (μm) | | | 0.2 | 0.2 | 0.2 | 0.2 | 0.2 | 0.2 | 0.2 | 0.2 | 0.2 |
| | Glass-transition temperature (° C.) | | | −20 | −20 | −20 | −20 | −20 | −20 | −20 | −20 | −20 |
| | Additive amount (parts by mass) | | | 11 | 11 | 11 | 11 | 11 | 11 | 11 | 11 | 11 |
| Evaluation | Permeability of separator | | | A | B | C | C | B | E | E | D | D |
| | Particle stability of organic particles A | | | A | A | A | A | A | A | A | E | A |
| | Blocking resistance of separator | | | A | A | A | A | A | A | A | E | A |

It can be seen from Table 1 that it was possible to form a functional layer that could cause a separator to display excellent shutdown function in Examples 1 to 13 in which the used composition for a functional layer contained organic particles containing a polymer that included an aromatic vinyl monomer unit in not less than a specific proportion and a wax that had a melting point of lower than a specific temperature.

On the other hand, it can be seen that shutdown function of a separator including an obtained functional layer was poor when using the composition for a functional layer of Comparative Example 1 in which organic particles that did not contain a wax having a melting point of lower than a specific temperature were used.

Moreover, it can be seen from Comparative Example 2 that it was not possible to form a functional layer that could cause a separator to display excellent shutdown function even when a wax having a melting point of lower than a specific temperature was separately added to the composition for a functional layer of Comparative Example 1.

Furthermore, it can be seen that it was also not possible to form a functional layer that could cause a separator to display excellent shutdown function with the composition for a functional layer of Comparative Example 3 in which a wax having a melting point of not lower than a specific temperature was used.

INDUSTRIAL APPLICABILITY

According to the present disclosure, it is possible to provide a composition for a non-aqueous secondary battery functional layer with which it is possible to form a functional layer that can cause a separator to display excellent shutdown function.

Moreover, according to the present disclosure, it is possible to provide a functional layer for a non-aqueous secondary battery that can cause a separator to display excellent shutdown function and a non-aqueous secondary battery member that includes the functional layer for a non-aqueous secondary battery.

Furthermore, according to the present disclosure, it is possible to provide a non-aqueous secondary battery that includes the non-aqueous secondary battery member.

The invention claimed is:

1. A composition for a non-aqueous secondary battery functional layer, wherein
the composition is a slurry composition that contains water and organic particles A,
the organic particles A contain: a saturated fatty acid zinc salt, a polymer X including an aromatic vinyl monomer unit in a proportion of 20 mass % or more and 100 mass % or less; and a wax having a melting point of 40° C. or higher and lower than 95° C., and
the wax is an ester wax.

2. The composition for a non-aqueous secondary battery functional layer according to claim 1, wherein the organic particles A have a glass-transition temperature of not lower than 30° C. and not higher than 80° C.

3. The composition for a non-aqueous secondary battery functional layer according to claim 1, further include non-conductive particles.

4. A functional layer for a non-aqueous secondary battery formed of a dried product of the composition for a non-aqueous secondary battery functional layer according to claim 3, wherein
the functional layer is a porous membrane layer.

5. A non-aqueous secondary battery member comprising: a substrate; and the functional layer for a non-aqueous secondary battery according to claim 4 formed on the substrate, wherein
the substrate is a releasable substrate, a separator substrate, or an electrode substrate.

6. The non-aqueous secondary battery member according to claim 5, wherein the substrate is the separator substrate.

7. A non-aqueous secondary battery comprising a positive electrode, a negative electrode, a separator, and an electrolyte solution, wherein
at least one of the positive electrode, the negative electrode, or the separator comprises the non-aqueous secondary battery member according to claim 5.

8. The composition for a non-aqueous secondary battery functional layer according to claim 1, wherein the organic particles A have a core-shell structure including a particulate core portion that contains the saturated fatty acid zinc salt, the polymer X and the wax and a shell portion that contains a polymer Y that is different from the polymer X,
the polymer Y include a (meth)acrylic acid ester monomer unit and an acid group-containing monomer unit, and
the shell portion partially cover the outer surface of the core portion or completely cover the outer surface of the core portion.

9. A functional layer for a non-aqueous secondary battery formed of a dried product of the composition for a non-aqueous secondary battery functional layer according to claim 1, wherein
the functional layer is an adhesive layer.

10. A non-aqueous secondary battery member comprising: a substrate; and the functional layer for a non-aqueous secondary battery according to claim 9 formed on the substrate, wherein
the substrate is a releasable substrate, a separator substrate, or an electrode substrate.

11. The non-aqueous secondary battery member according to claim 10, wherein the substrate is the separator substrate.

12. A non-aqueous secondary battery comprising a positive electrode, a negative electrode, a separator, and an electrolyte solution, wherein
at least one of the positive electrode, the negative electrode, or the separator comprises the non-aqueous secondary battery member according to claim 10.

* * * * *